(12) United States Patent
Handshaw et al.

(10) Patent No.: US 11,922,267 B2
(45) Date of Patent: *Mar. 5, 2024

(54) BARCODE READER WITH OFF-PLATTER DETECTION

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/743,665

(22) Filed: May 13, 2022

(65) Prior Publication Data
US 2022/0269875 A1    Aug. 25, 2022

Related U.S. Application Data

(63) Continuation of application No. 17/011,688, filed on Sep. 3, 2020, now Pat. No. 11,334,738, which is a continuation of application No. 16/724,043, filed on Dec. 20, 2019, now Pat. No. 11,023,698.

(51) Int. Cl.
| | | |
|---|---|---|
| *G06K 7/14* | (2006.01) | |
| *G06K 7/10* | (2006.01) | |
| *G06N 3/02* | (2006.01) | |

(52) U.S. Cl.
CPC ....... *G06K 7/1413* (2013.01); *G06K 7/10722* (2013.01); *G06N 3/02* (2013.01)

(58) Field of Classification Search
CPC ..... G06K 7/1413; G06K 7/10722; G06N 3/02
USPC ..................................... 235/462.41
See application file for complete search history.

(56) References Cited

U.S. PATENT DOCUMENTS

| | | | |
|---|---|---|---|
| 10,060,785 B2* | 8/2018 | McQueen | G01G 23/00 |
| 10,921,177 B1* | 2/2021 | Barkan | G01G 21/283 |
| 11,326,933 B2* | 5/2022 | Barkan | H01L 27/14605 |
| 11,334,738 B2* | 5/2022 | Handshaw | G06N 3/02 |
| 11,397,104 B2* | 7/2022 | O'Donnell | G01G 21/28 |

* cited by examiner

*Primary Examiner* — Ahshik Kim
(74) *Attorney, Agent, or Firm* — Yuri Astvatsaturov

(57) ABSTRACT

A barcode reader has a housing, weigh platter, and off-platter detection assembly including first and second imaging assemblies in communication with a controller. The first imaging assembly has a first imager configured to capture an image of a first lateral edge of the weigh platter. The second imaging assembly has a second imager configured to capture an image of a second lateral edge of the weigh platter. The controller is configured to: identify and locate the first and second lateral edges; receive first and second images from the imagers; allow the weight of an object to be recorded if determined that a footprint of the object does not extend over the first or second lateral edges; and prevent the weight of the object from being recorded and/or providing an alert to a user if determined that the footprint of the object does extend over the first or second lateral edges.

14 Claims, 7 Drawing Sheets

BARCODE READER WITH OFF-PLATTER DETECTION

CROSS-REFERENCE TO RELATED APPLICATIONS

This application is a continuation of U.S. patent application Ser. No. 17/011,688, filed on Sep. 3, 2020, which is a continuation of U.S. patent application Ser. No. 16/724,043, filed on Dec. 20, 2019, both of which are incorporated herein by reference in their entirety.

FIELD OF THE DISCLOSURE

The present patent relates generally to barcode readers and, in particular, to barcode readers having off-platter detection.

BACKGROUND

One of the functions of a barcode reader having a weigh platter is to weigh produce or other products that are priced by weight in order to assist in determining the price of the produce or product. However, produce and products are varied in shape and size and there can be issues where part of the produce or product sits off of the weigh platter, resulting in incorrect weight measurement and, therefore, incorrect pricing. Therefore, there is a need to be able to identify when produce or products being weighed on a weigh platter of a barcode reader extend off of the weigh platter during the weighing process to reduce or eliminate instances of incorrect weight measurement and pricing.

SUMMARY

In an embodiment, the present invention is a barcode reader configured to be supported by a workstation, the barcode reader comprising a housing, a weigh platter, and an off-platter detection assembly. The housing has a lower housing portion with an upper surface facing a product scanning region and an upper housing portion extending above the lower housing portion. The weigh platter is configured to measure a weight of an object placed on the weigh platter and has a surface extending in a transverse plane, a proximal edge adjacent the upper housing portion, a first lateral edge extending non-parallel to the proximal edge, a second lateral edge, opposite the first lateral edge, extending non-parallel to the proximal edge, and a distal edge, opposite the proximal edge, extending non-parallel to the first and second lateral edges. The off-platter detection assembly includes a first and second imaging assemblies in communication with a controller. The first imaging assembly is positioned within the upper housing portion and has a first imager having a first field-of-view extending over the surface of the weigh platter. The first field-of-view has a first central field-of-view axis, a first lower boundary, and a first lateral boundary and the first imager is configured to capture an image of the first lateral edge of the surface within the first field-of-view. The second imaging assembly is positioned within the upper housing portion and has a second imager having a second field-of-view extending over the surface of the weigh platter. The second field-of-view has a second field-of-view axis, a second lower boundary, and a second lateral boundary and the second imager configured to capture an image of the second lateral edge of the surface within the second field-of-view. The controller is configured to: identify and locate the first lateral edge based upon a first training image, the first training image comprising an image captured by the first imager of the surface and the first lateral edge without an object placed on the weigh platter; identify and locate the second lateral edge based upon a second training image, the second training image comprising an image captured by the second imager of the surface and the second lateral edge without an object placed on the weigh platter; receive a first image captured by the first imager and a second image captured by the second imager; allow the weight of the object placed on the weigh platter to be recorded by a host system operatively coupled to the controller if the controller determines: (1) that a footprint of the object positioned on the weigh platter does not extend over the first lateral edge based on the first image; and (2) that the footprint of the object positioned on the weigh platter does not extend over the second lateral edge based on the second image; and prevent the weight of the object place on the weigh platter from being recorded by the host system and/or providing an alert to a user if the controller determines: (1) that the footprint of the object positioned on the weigh platter does extend over the first lateral edge based on the first image; or (2) that the footprint of the object positioned on the weigh platter does extend over the second lateral edge based on the second image.

In another embodiment, the present invention is a barcode reader configured to be supported by a workstation, the barcode reader comprising a housing, a weigh platter, and an off-platter detection assembly. The housing has a lower housing portion with an upper surface facing a product scanning region and an upper housing portion extending above the lower housing portion. The weigh platter is configured to measure a weight of an object placed on the weigh platter and has a surface extending in a transverse plane, a proximal edge adjacent the upper housing portion, a first lateral edge extending non-parallel to the proximal edge, a second lateral edge, opposite the first lateral edge, extending non-parallel to the proximal edge, and a distal edge, opposite the proximal edge, extending non-parallel to the first and second lateral edges. The off-platter detection assembly includes a first barrier, a second barrier, and first and second imaging assemblies in communication with a controller. The first barrier is positioned at an intersection of the first lateral edge and the distal edge of the surface and the second barrier is positioned at an intersection of the second lateral edge and the distal edge. The first imaging assembly is positioned within the upper housing portion and has a first imager having a first field-of-view extending over the surface of the weigh platter. The first field-of-view has a first central field-of-view axis, a first lower boundary, and a first lateral boundary and the first imager is configured to capture an image of the first barrier within the first field-of-view. The second imaging assembly is positioned within the upper housing portion and has a second imager having a second field-of-view extending over the surface of the weigh platter, The second field-of-view has a second field-of-view axis, a second lower boundary, and a second lateral boundary and the second imager configured to capture an image of the second barrier within the second field-of-view. The controller is configured to: identify and locate the first barrier based upon a first training image, the first training image comprising an image captured by the first imager of the first barrier without an object placed on the weigh platter; identify and locate the second barrier based upon a second training image, the second training image comprising an image captured by the second imager of the second barrier without an object placed on the weigh platter; receive a first image captured by the first imager and a second image captured by the second imager; allow the weight of the object placed on the weigh platter to be recorded by a host system operatively coupled to the controller if the controller determines: (1) that the first image comprises all or substantially all of the first barrier; and (2) that the second image comprises all or substantially all of the second barrier; and prevent the weight of the object place on the weigh platter from being recorded by the host system and/or providing an alert to a user if the controller determines: (1) that the first image does not comprise all or substantially all of the first barrier; or (2) that the second image does not comprise all or substantially all of the second barrier.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
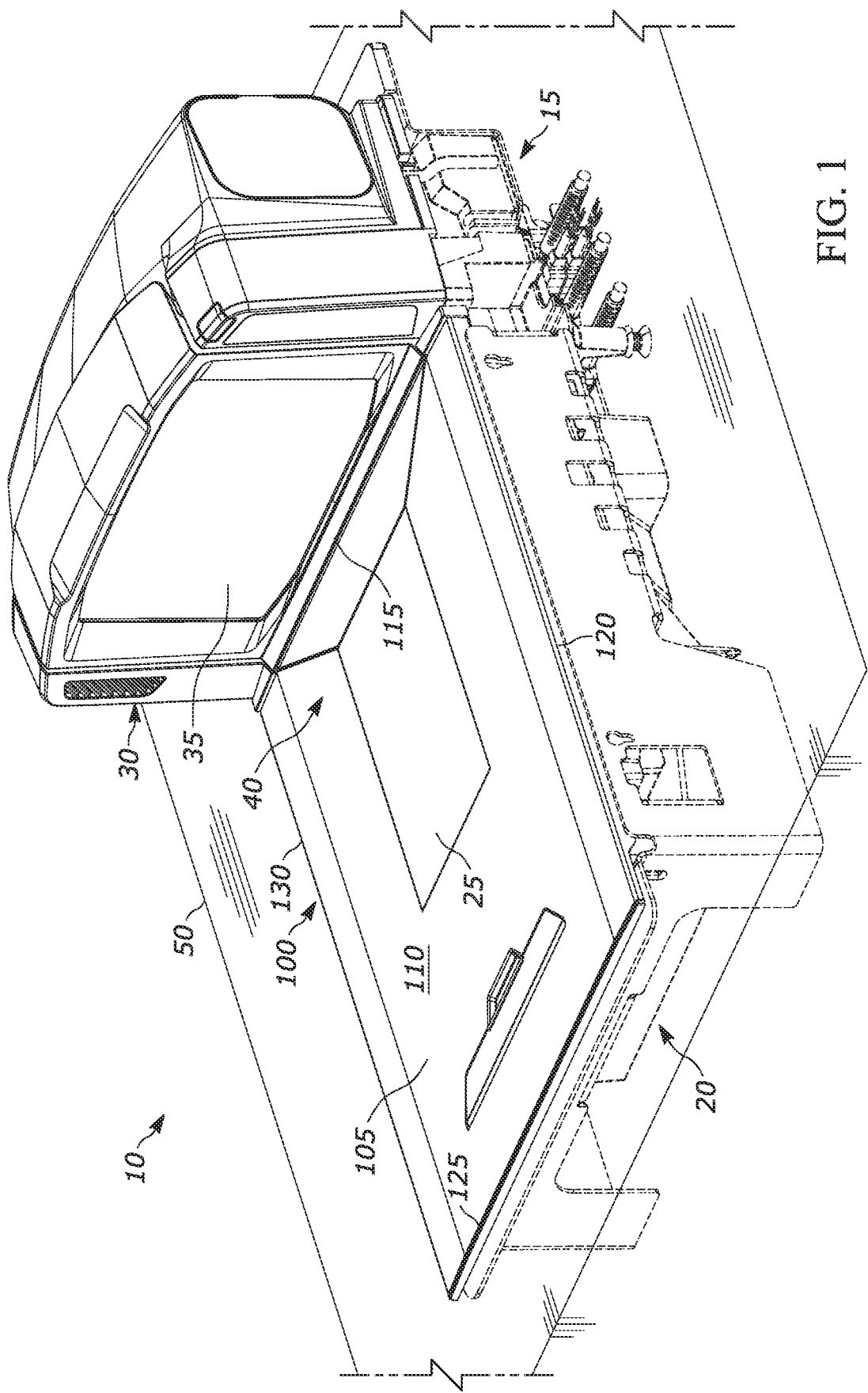
FIG. 1 illustrates a front perspective view of an example barcode reader supported by a workstation.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to barcode readers having weigh platter assemblies and off-platter detection assemblies to identify when an object extends off of a lateral edge of the weigh platter of the weigh platter assembly. The examples herein use a pair of cameras, which can be part of an off-platter detection assembly or cameras existing in the barcode reader for object recognition, that are positioned in opposing lower corners of the upper housing portion of the barcode reader and have overlapping field-of-view that are oriented to view objects placed on the weigh platter and determine from images from the cameras whether there is an off platter event. The cameras can also be used for object recognition for the barcode reader.

Referring to FIG. 1, an example barcode reader 10, such as the Zebra® MP7000 bioptic barcode reader, is shown that can be configured to be supported by a workstation 50, such as a checkout counter at a point-of-sale (POS) of a retail store, and has a product scanning region 40. Barcode reader 10 includes a housing 15 and a weigh platter assembly 100. Housing 15 includes a lower housing portion 20 that houses weigh platter assembly 100 and an upper housing portion 30 that extends above lower housing portion 20. Upper housing portion 30 includes a generally upright window 35 configured to allow a first light to pass between product scanning region 40 and an interior region 45 of housing 15. In addition, if barcode reader 10 is a bioptic barcode reader, lower housing portion 20 will include a generally horizontal window 25, which in the example shown is positioned in a weigh platter 105 of weigh platter assembly 100, configured to allow a second light to pass between product scanning region 40 and interior region 45 of housing 15. The first and second lights intersect to define product scanning region 40 of barcode reader 10 where a product can be scanned for sale at the POS.

Weigh platter assembly 100 includes a weigh platter 105 positioned within lower housing portion 20, which is configured to measure the weight of an object placed on weigh platter 105. Weigh platter 105 has a surface 110 that extends in a transverse plane, is generally parallel to a top surface of workstation 50, faces product scanning region 40, a proximal edge 115, a first lateral edge 120, a second lateral edge 130, and a distal edge 125. In the example shown, proximal edge 115 of weigh platter 105 is adjacent upper housing portion 30 and would be the edge furthest from a user of weigh platter assembly 100 and/or barcode reader 10. First lateral edge 120 extends non-parallel to proximal edge 115. Second lateral edge 130 also extends non-parallel to proximal edge 155 and is opposite first lateral edge 120. Distal edge 125 is opposite proximal edge 115, would be the edge closest to the user, and extends non-parallel to first lateral edge 120 and second lateral edge 130. In the example shown, weigh platter 105 is generally rectangular and first lateral edge 120 and second lateral edge 130 are perpendicular to proximal edge 115 and distal edge 125 is perpendicular to first lateral edge 120 and second lateral edge 130 and parallel to proximal edge 115.

Figure 2:
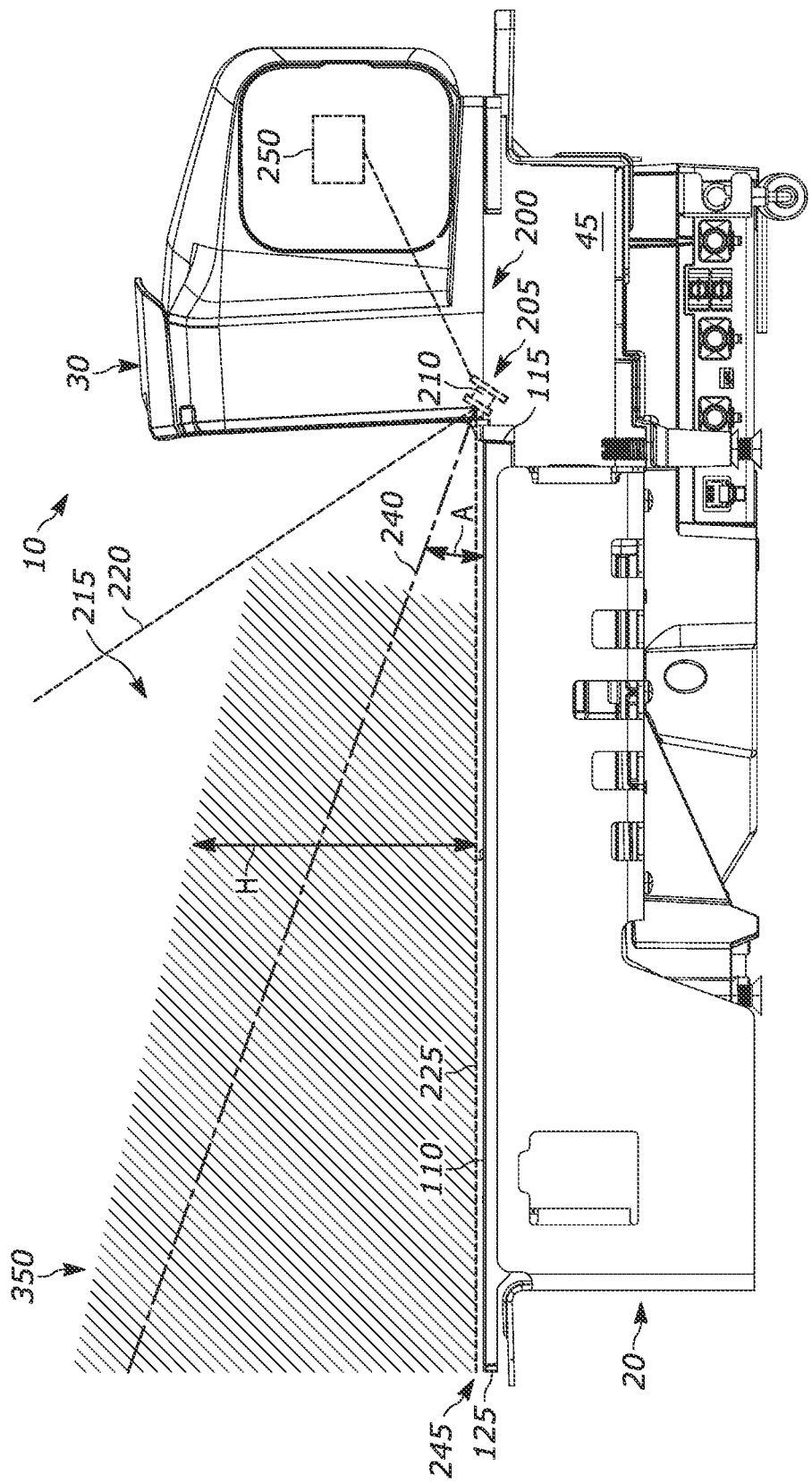
FIG. 2 illustrates a right side view of the barcode reader of FIG. 1 with a first example off-platter detection assembly.
Figure 3:
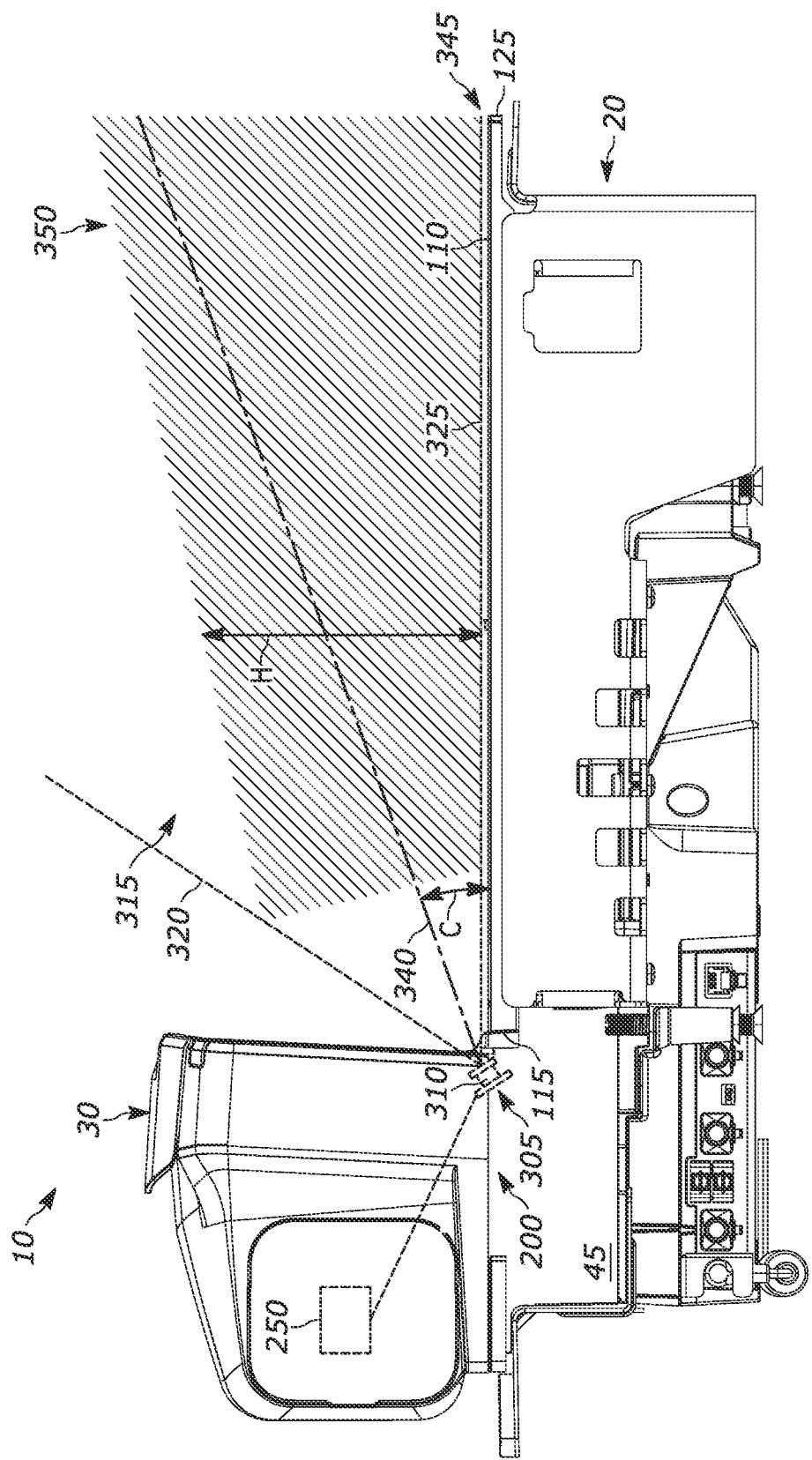
FIG. 3 illustrates a left side view of the barcode reader of FIG. 2.
Figure 4:
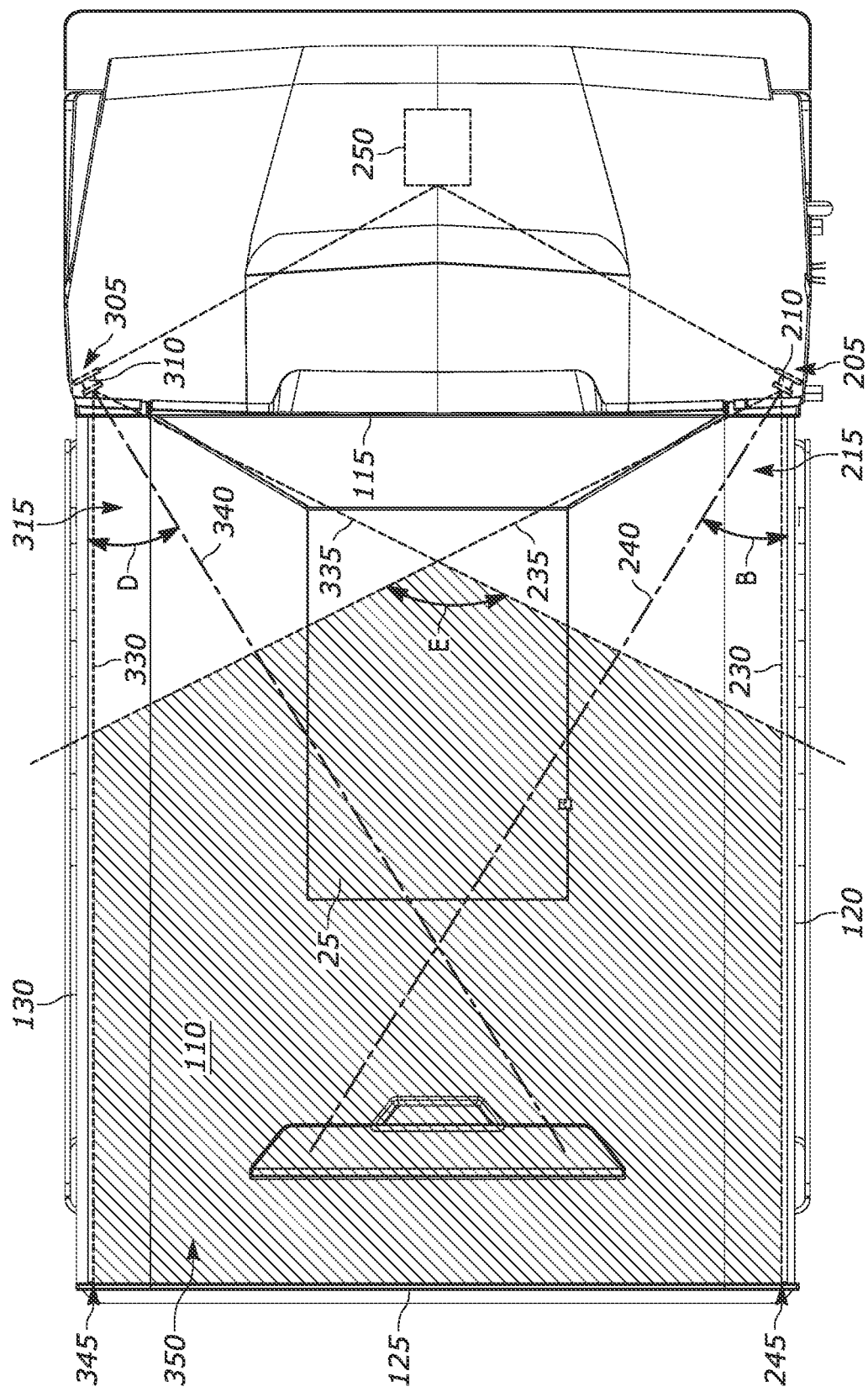
FIG. 4 illustrates a top view of the barcode reader of FIG. 2.

Referring to FIGS. 2-4, barcode reader 10 is illustrated with a first example off-platter detection assembly 200 that generally includes first and second imaging assemblies 205, 305 and a controller 250 in communication with first and second imaging assemblies 205, 305. First and second imaging assemblies 205, 305 can be an imaging assemblies that are dedicated to off-platter detection assembly 200 or imaging assemblies that are already part of barcode reader 10 and used for object recognition and positioned within upper housing portion 30.

First imaging assembly 205 is positioned within upper housing portion 30 and includes a first imager 210, preferably a 2 mega pixel camera, that has a first field-of-view 215 that extends over surface 110 of weigh platter 105. First imager 210 is configured to capture an image of first lateral edge 120 of weigh platter 105 within first field-of-view 215, which has a first central field-of-view axis 240, an upper boundary 220, a lower boundary 225, opposite upper boundary 220, a first lateral boundary 230, and a second lateral boundary 235, opposite first lateral boundary 230. Lower boundary 225 of first field-of-view 215 is substantially adjacent and parallel to surface 110 of weigh platter 105 and first lateral boundary 230 is substantially adjacent and parallel to first lateral edge 120 such that a first edge 245 defined by the intersection of lower boundary 225 and first lateral boundary 230 is substantially adjacent first lateral edge 120. By positioning and orienting first imager 210 so that first edge 245 follows first lateral edge 120, first imager 210 can easily detect the presence of an object that extends over first lateral edge 120. Since first imager 210 is positioned directly along first lateral edge 120, it will have full visibility of any objects extend over first lateral edge 120. In the example shown, to provide the desired coverage of first field-of-view 215 the origin of first field-of-view 215 at first imager 210 is collinear with first lateral edge 120 and the first central field-of-view axis 240 extends upward away from surface 110 at an angle A within the range of 15 degrees and 25 degrees relative to surface 110 and laterally away from first lateral edge 120 at an angle B within the range of 60 degrees and 70 degrees relative to first lateral edge 120.

Second imaging assembly 305 is also positioned within upper housing portion 30 and includes a second imager 310, preferably a 2 mega pixel camera, that has a second field-of-view 315 that extends over surface 110 of weigh platter 105. Second imager 310 is configured to capture an image of second lateral edge 130 of weigh platter 105 within second field-of-view 315, which has a second central field-of-view axis 340, an upper boundary 320, a lower boundary 325, opposite upper boundary 320, a first lateral boundary 330, and a second lateral boundary 335, opposite first lateral boundary 330. Lower boundary 325 of second field-of-view 315 is substantially adjacent and parallel to surface 110 of weigh platter 105 and first lateral boundary 330 is substantially adjacent and parallel to second lateral edge 130 such that a second edge 345 defined by the intersection of lower boundary 325 and first lateral boundary 330 is substantially adjacent second lateral edge 130. By positioning and orienting second imager 310 so that second edge 345 follows second lateral edge 130, second imager 310 can easily detect the presence of an object that extends over second lateral edge 130. Since second imager 310 is positioned directly along second lateral edge 130, it will have full visibility of any objects extend over second lateral edge 130. In the example shown, to provide the desired coverage of second field-of-view 315 the origin of second field-of-view 315 at second imager 310 is collinear with second lateral edge 130 and the second central field-of-view axis 340 extends upward away from surface 110 at an angle C within the range of 15 degrees and 25 degrees relative to surface 110 and laterally away from second lateral edge 130 at an angle D within the range of 60 degrees and 70 degrees relative to second lateral edge 130.

Preferably, when configured as described above, first and second field-of-view 215, 315 of first and second imagers 210, 310 would be positioned to angle sharply across surface 110. For example, first and second imagers 210, 310 can have a combined horizontal field-of-view angle E between second lateral boundary 235 of first field-of-view 215 and second lateral boundary 335 of second field-of-view 315 that is within a range of 100 degrees and 135 degrees, which would provide a visible volume that is as good or better than using a single landscape imager. The width of the combined first and second field-of-view 215, 315 also provide better visibility to proximal and distal edges 115, 125 of weigh platter 105, which can also help with gesture tracking for sweethearting, such as ticket-switching and scan avoidance. The area where first and second fields-of-view 215, 315 overlap defines an overlap region 350, which will define a combined vertical field-of-view height H that is greater than or equal to 5 inches when measured at a longitudinal mid-point of horizontal window 25. With first and second fields-of-view 215, 315 angled upwards in this manner, they can also see a taller area further out.

Controller 250 is in communication with first and second imaging assemblies 205, 305 and can be calibrated initially (at the factory or during installation or final testing) by being configured to identify and locate first lateral edge 120 based upon a first training image and second lateral edge 130 based on a second training image. The first and second training images are images captured by first and second imagers 210, 310 of surface 110 of weigh platter 105 and first and second lateral edges 120, 130 without an object placed on weigh platter 105. For example, the location of the first and second lateral edges 120, 130 can be identified by a user observing the training image by drawing or indicating lies on the training image using a configuration tool or the first and second lateral edges 120, 130 could be detected automatically by controller 250.

Controller 250 can also be configured to receive a first image captured by first imager 210 and determine if a footprint of an object positioned on weigh platter 105, which is the portion of the object that contacts weigh platter 105, extends over first lateral edge 120 based on the first image. Controller 250 will also receive a second image captured by second imager 310 and determine if the footprint of the object extends over the second lateral edge 130 based on the second image. Controller 250 can determine if the footprint extends over first or second lateral edges 120, 130 by determining if part of the first or second lateral edges 120, 130 or the gap between weigh platter 105 and lower housing portion 20 or workstation 50, determined during calibration based on the training image, is blocked or not visible. Controller 250 can also use a convolutional neural network (CNN) to determine whether the footprint extends over first or second lateral edges 120, 130, for example, by identifying the object and its orientation and comparing it against a database of dimensional data to determine whether the footprint crosses first or second lateral edges 120, 130. In addition, first and second imaging assemblies 205, 305 can also be communicatively coupled to a convolutional neural network to provide object recognition for barcode reader 10 based on the first and/or second images, in addition to providing off-platter detection. The positioning of first and second imagers 210, 310 as described above provide for an ideal object recognition arrangement, as first and second imagers 210, 310 can better determine the size and extent of any given object. If controller 250 determines that the footprint of the object positioned on weigh platter 105 does not extend over either first or second lateral edges 120, 130 based on the first and second images, respectively, controller 250 can be configured to allow the measured weight of the object to be recorded, for example, by a host system operatively coupled to controller 250. If controller 250 determines that the footprint of the object does extend over first lateral edge 120 based on the first image or second lateral edge 130 based on the second image, controller 250 can be configured to prevent the measured weight of the object from being recorded, for example, by the host system, and/or provide an alert to a user, such as by some type of visual or audio alert.

Figure 5:
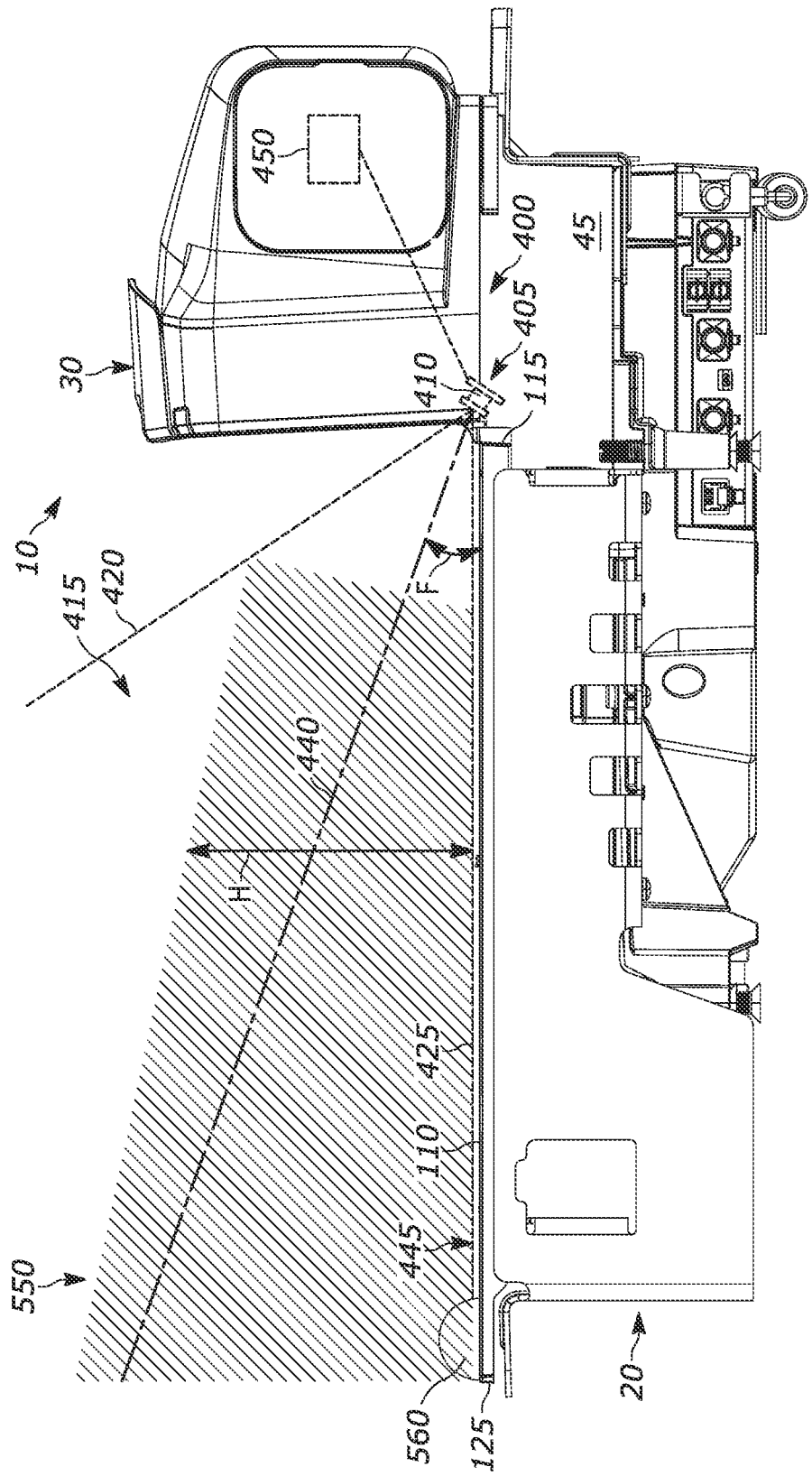
FIG. 5 illustrates a left side view of the barcode reader of FIG. 1 with a second example off-platter detection assembly.
Figure 6:
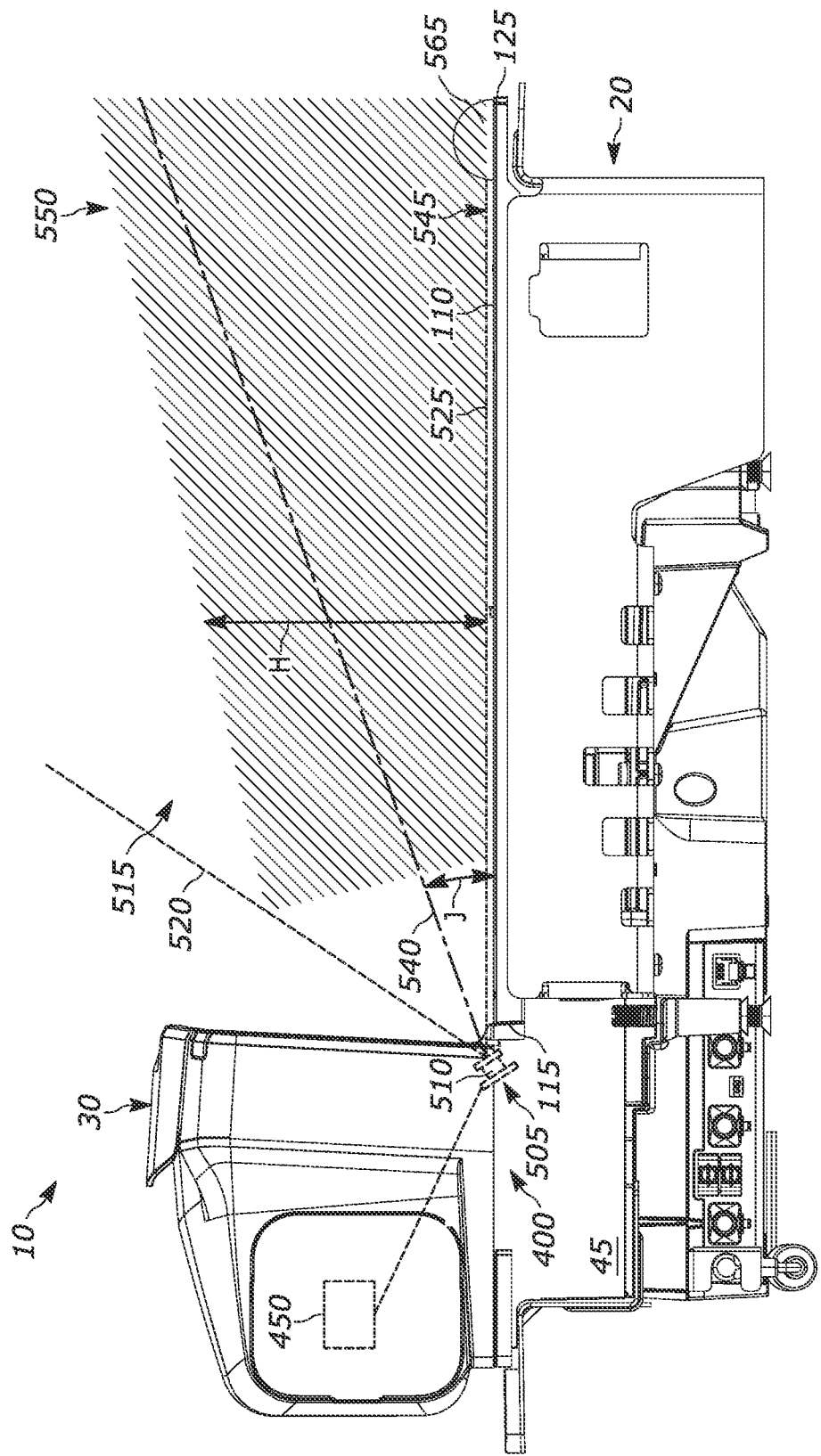
FIG. 6 illustrates a right side view of the barcode reader of FIG. 5.
Figure 7:
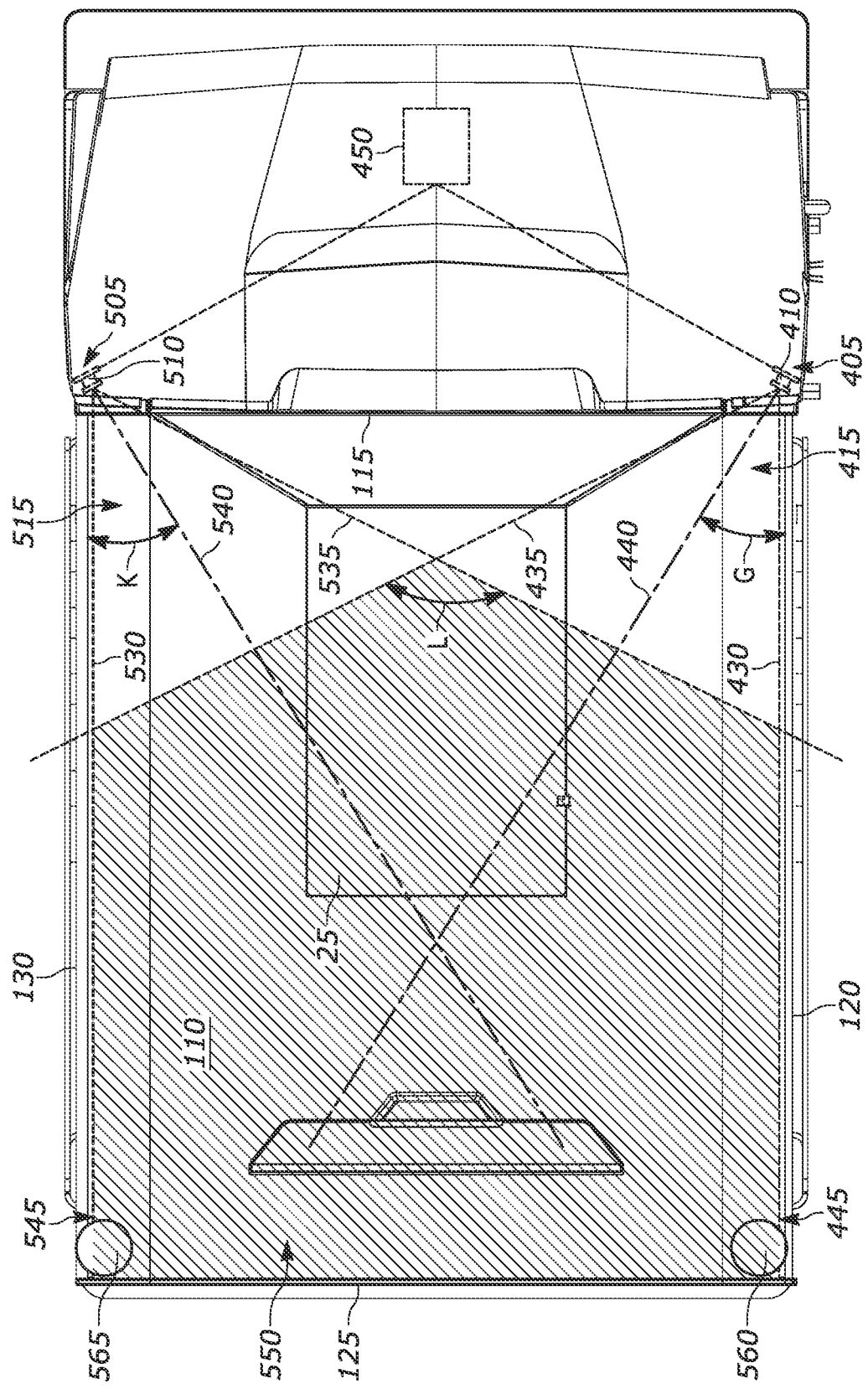
FIG. 7 illustrates a top view of the barcode reader of FIG. 5.

Referring to FIGS. 5-7, barcode reader 10 is illustrated with a second example off-platter detection assembly 400 that generally includes first and second imaging assemblies 405, 505, first and second barriers 560, 565 positioned at an intersection of distal edge 125 and first and second lateral edges 120, 130, respectively, and a controller 450 in communication with first and second imaging assemblies 405, 505. First and second imaging assemblies 405, 505 can be an imaging assemblies that are dedicated to off-platter detection assembly 400 or imaging assemblies that are already part of barcode reader 10 and used for object recognition and positioned within upper housing portion 30.

First imaging assembly 405 is positioned within upper housing portion 30 and includes a first imager 410, preferably a 2 mega pixel camera, that has a first field-of-view 415 that extends over surface 110 of weigh platter 105. First imager 410 is configured to capture an image of first barrier 560 within first field-of-view 415, which has a first central field-of-view axis 440, an upper boundary 420, a lower boundary 425, opposite upper boundary 420, a first lateral boundary 430, and a second lateral boundary 435, opposite first lateral boundary 430. Lower boundary 425 of first field-of-view 415 is substantially adjacent and parallel to surface 110 of weigh platter 105 and first lateral boundary 430 is substantially adjacent and parallel to first lateral edge 120 such that a first edge 445 defined by the intersection of lower boundary 425 and first lateral boundary 430 is substantially adjacent first lateral edge 120. By positioning and orienting first imager 410 so that first edge 445 follows first lateral edge 120, first imager 410 can easily detect the presence of an object that extends over first lateral edge 120. Since first imager 410 is positioned directly along first lateral edge 120, it will have full visibility of any objects extend over first lateral edge 120. In the example shown, to provide the desired coverage of first field-of-view 415 the origin of first field-of-view 415 at first imager 410 is collinear with first lateral edge 120 and the first central field-of-view axis 440 extends upward away from surface 110 at an angle F within the range of 15 degrees and 25 degrees relative to surface 110 and laterally away from first lateral edge 120 at an angle G within the range of 60 degrees and 70 degrees relative to first lateral edge 120.

Second imaging assembly 505 is also positioned within upper housing portion 30 and includes a second imager 510, preferably a 2 mega pixel camera, that has a second field-of-view 515 that extends over surface 110 of weigh platter 105. Second imager 510 is configured to capture an image of second barrier 565 within second field-of-view 515, which has a second central field-of-view axis 540, an upper boundary 520, a lower boundary 525, opposite upper boundary 520, a first lateral boundary 530, and a second lateral boundary 535, opposite first lateral boundary 530. Lower boundary 525 of second field-of-view 515 is substantially adjacent and parallel to surface 110 of weigh platter 105 and first lateral boundary 530 is substantially adjacent and parallel to second lateral edge 130 such that a second edge 545 defined by the intersection of lower boundary 525 and first lateral boundary 530 is substantially adjacent second lateral edge 130. By positioning and orienting second imager 510 so that second edge 545 follows second lateral edge 130, second imager 510 can easily detect the presence of an object that extends over second lateral edge 130. Since second imager 510 is positioned directly along second lateral edge 130, it will have full visibility of any objects extend over second lateral edge 130. In the example shown, to provide the desired coverage of second field-of-view 515 the origin of second field-of-view 515 at second imager 510 is collinear with second lateral edge 130 and the second central field-of-view axis 540 extends upward away from surface 110 at an angle J within the range of 15 degrees and 25 degrees relative to surface 110 and laterally away from second lateral edge 130 at an angle K within the range of 60 degrees and 70 degrees relative to second lateral edge 130.

Preferably, when configured as described above, first and second field-of-view 415, 515 of first and second imagers 410, 510 would be positioned to angle sharply across surface 110. For example, first and second imagers 410, 510 can have a combined horizontal field-of-view angle L between second lateral boundary 435 of first field-of-view 415 and second lateral boundary 535 of second field-of-view 515 that is within a range of 100 degrees and 135 degrees, which would provide a visible volume that is as good or better than using a single landscape imager. The width of the combined first and second field-of-view 415, 515 also provides better visibility to proximal and distal edges 115, 125 of weigh platter 105, which can also help with gesture tracking for sweethearting, such as ticket-switching and scan avoidance. The area where first and second fields-of-view 415, 515 overlap defines an overlap region 550, which will define a combined vertical field-of-view height H that is greater than or equal to 5 inches when measured at a longitudinal mid-point of horizontal window 25. With first and second fields-of-view 415, 515 angled upwards in this manner, they can also see a taller area further out.

Controller 450 is in communication with first and second imaging assemblies 405, 505 and can be calibrated initially (at the factory or during installation or final testing) by being configured to identify and locate first barrier 560 based upon a first training image and second barrier 565 based on a second training image. The first and second training images are images captured by first and second imagers 410, 510 of surface 110 of weigh platter 105 and first and second barriers 560, 565 without an object placed on weigh platter 105. For example, the location of first and second barriers 560, 565 can be identified by a user observing the training image by drawing or indicating lies on the training image using a configuration tool or first and second barriers 560, 565 could be detected automatically by controller 450.

Controller 450 can also be configured to receive a first image captured by first imager 410 and determine if the first image comprises all or substantially all of first barrier 560 in the first image. Controller 450 will also receive a second image captured by second imager 510 and determine if the second image comprises all or substantially all of the second barrier 565 in the second image. In addition, first and second imaging assemblies 405, 505 can also be communicatively coupled to a convolutional neural network to provide object recognition for barcode reader 10 based on the first and/or second images, in addition to providing off-platter detection. The positioning of first and second imagers 410, 510 as described above provide for an ideal object recognition arrangement, as first and second imagers 410, 510 can better determine the size and extent of any given object. If controller 450 determines the first image comprises all or substantially all of first barrier 560 and the second image comprises all or substantially all of second barrier 565, indicating that no object is extending over first or second lateral edges 120, 130, controller 450 can be configured to allow the measured weight of the object to be recorded, for example, by a host system operatively coupled to controller 450. If controller 450 determines that the first image does not comprise all of substantially all of first barrier 560 and/or the second image does not comprise all of substantially all of second barrier 565, indicating that an object is extending over first and/or second lateral edges 120, 130, controller 450 can be configured to prevent the measured weight of the object from being recorded, for example, by the host system, and/or provide an alert to a user, such as by some type of visual or audio alert.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method. Also, at least some of the figures may or may not be drawn to scale.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s).

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A barcode reader configured to be supported by a workstation, the barcode reader comprising:
   a housing having a lower housing portion with an upper surface facing a product scanning region and an upper housing portion extending above the lower housing portion;
   a weigh platter configured to support an object placed on the weigh platter for obtaining a weight of the object, the weigh platter having a surface extending in a transverse plane, a proximal edge adjacent the upper housing portion, a first lateral edge extending non-parallel to the proximal edge, a second lateral edge, opposite the first lateral edge, extending non-parallel to the proximal edge, and a distal edge, opposite the proximal edge, extending non-parallel to the first and second lateral edges; and
   an off-platter detection assembly comprising:
   a first imaging assembly positioned within the upper housing portion and having a first imager having a first field-of-view extending over the surface of the weigh platter, the first field-of-view having a first central field-of-view axis, a first lower boundary, and a first lateral boundary, the first imager configured to capture an image of the first lateral edge of the surface within the first field-of-view;
   a second imaging assembly positioned within the upper housing portion and having a second imager having a second field-of-view extending over the surface of the weigh platter, the second field-of-view having a second central field-of-view axis, a second lower boundary, and a second lateral boundary, the second imager configured to capture an image of the second lateral edge of the surface within the second field-of-view; and a controller in communication with the first imaging assembly and the second imaging assembly, the controller configured to:

allow the weight of the object placed on the weigh platter to be recorded by a host system operatively coupled to the controller if the controller determines: (1) that a footprint of the object positioned on the weigh platter does not extend over the first lateral edge based on the first image; and (2) that the footprint of the object positioned on the weigh platter does not extend over the second lateral edge based on the second image; and prevent the weight of the object placed on the weigh platter from being recorded by the host system and/or providing an alert to a user if the controller determines: (1) that the footprint of the object positioned on the weigh platter does extend over the first lateral edge based on the first image; or (2) that the footprint of the object positioned on the weigh platter does extend over the second lateral edge based on the second image.

2. The barcode reader of claim 1, wherein the first lower boundary of the first field-of-view of the first imager is substantially adjacent and substantially parallel to the surface.

3. The barcode reader of claim 2, wherein the second lower boundary of the second field-of-view of the second imager is substantially adjacent and substantially parallel to the surface.

4. The barcode reader of claim 1, wherein the first lateral boundary of the first field-of-view of the first imager is substantially adjacent and substantially parallel to the first lateral edge of the surface.

5. The barcode reader of claim 4, wherein the second lateral boundary of the second field-of-view of the second imager is substantially adjacent and substantially parallel to the second lateral edge of the surface.

6. The barcode reader of claim 1, wherein a first edge defined by an intersection of the first lower boundary with the first lateral boundary is substantially adjacent to the first lateral edge of the surface.

7. The barcode reader of claim 6, wherein a second edge defined by an intersection of the second lower boundary with the second lateral boundary is substantially adjacent to the second lateral edge of the surface.

8. The barcode reader of claim 1, wherein an origin of the first field-of-view is substantially collinear with the first lateral edge.

9. The barcode reader of claim 8, wherein an origin of the second field-of-view is substantially collinear with the second lateral edge.

10. The barcode reader of claim 1, wherein: the first central field-of-view axis extends upward away from the surface within a range of 15 degrees and 25 degrees relative to the surface; and the second central field-of-view axis extends upward away from the surface within a range of 15 degrees and 25 degrees relative to the surface.

11. The barcode reader of claim 10, wherein: the first central field-of-view axis extends laterally away from the first lateral edge within a range of 60 degrees and 70 degrees relative to the first lateral edge; and the second central field-of-view axis extends laterally away from the second lateral edge within a range of 60 degrees and 70 degrees relative to the second lateral edge.

12. The barcode reader of claim 1, wherein the first and second imagers have a combined horizontal field-of-view angle within a range of 100 degrees and 135 degrees.

13. The barcode reader of claim 1, wherein the first and second imagers have a combined vertical field-of-view height that is greater than or equal to 5 inches when measured at a mid-point of a horizontal window positioned in the weigh platter.

14. The barcode reader of claim 1, wherein the first and second imaging assemblies are communicatively coupled to a convolutional neural network to provide object recognition based on the first image and/or the second image.

* * * * *